United States Patent [19]

Karthaus et al.

[11] Patent Number: 5,224,359
[45] Date of Patent: Jul. 6, 1993

[54] SOLVENT CONDENSER FOR AN APPARATUS FOR RECOVERING SOLVENTS

[75] Inventors: Michael Karthaus, Neuss; Peter Hermanns, Wesel; Klaus Hermanns, Hünxe; Gerhard Kusenberg, Wesel; Norbert Hagenbruck, Oberhausen, all of Fed. Rep. of Germany

[73] Assignees: Herco-Kuhltechnik Hermanns und Co.; Air Product GmbH, both of Fed. Rep. of Germany

[21] Appl. No.: 807,118

[22] Filed: Dec. 13, 1991

[30] Foreign Application Priority Data

Dec. 17, 1990 [DE] Fed. Rep. of Germany ....... 4040390

[51] Int. Cl.$^5$ .......................... B01D 5/00; B01D 53/00
[52] U.S. Cl. .................................... 62/515; 34/73
[58] Field of Search .................. 62/515; 34/73, 74, 76, 34/78

[56] References Cited

U.S. PATENT DOCUMENTS

| | | | |
|---|---|---|---|
| 1,371,914 | 3/1921 | Lewis et al. | 34/74 |
| 3,991,481 | 11/1976 | Coraor et al. | 34/28 |
| 4,276,751 | 7/1981 | Saltzman et al. | 62/138 |
| 4,852,368 | 8/1989 | Bravo | 62/515 |
| 4,857,565 | 8/1989 | Henning et al. | 523/343 |
| 4,982,512 | 1/1991 | McClenny | 34/77 |

FOREIGN PATENT DOCUMENTS

| | | |
|---|---|---|
| 0417592 | 3/1990 | European Pat. Off. . |
| 2337055 | 2/1975 | Fed. Rep. of Germany . |
| 3501643 | 7/1986 | Fed. Rep. of Germany . |
| 3930239 | 3/1991 | Fed. Rep. of Germany . |
| 2328163 | 5/1977 | France . |
| 8901101 | 12/1990 | Netherlands . |
| 2010104 | 2/1979 | United Kingdom . |

OTHER PUBLICATIONS

Lueger, Lexikon der Technik, 4. Auflage, Deutsche Verlags-Anstalt Stuttgart, 1970, Band 16, Seiten 533 bis 536.

Primary Examiner—Albert J. Makay
Assistant Examiner—William C. Doerrler
Attorney, Agent, or Firm—Ratner & Prestia

[57] ABSTRACT

A solvent condenser for an apparatus for recovering solvent from a carrier gas/solvent mixture is formed by at least one flooded evaporator.

11 Claims, 2 Drawing Sheets

SOLVENT CONDENSER FOR AN APPARATUS FOR RECOVERING SOLVENTS

BACKGROUND OF THE INVENTION

1. Field of the Invention

The invention relates to a solvent condenser for an apparatus for recovering solvent from a carrier gas/solvent mixture.

2. Description of the Prior Art

In many industrial processes, for example in the coating and drying of tapes, foils, etc., such as audio or video tapes, solvent vapours arise which must be collected and recovered because they are mostly explosive when mixed with air and are almost always harmful to health as well. As a rule, the driers, and frequently also the coaters, are encapsulated, shielded from the access of air and held under an inert atmosphere, for example nitrogen. At the same time, the locks are supplied with inert gas. This avoids the possibility of an explosion and prevents the escape of vapours which are a health hazard.

A modern solvent recovery apparatus, as disclosed for example in elder European patent application 90 116 885.6 therefore as a rule comprises two circuits independent of each other, that is
a carrier gas circuit from which the solvent is condensed out and
a low-temperature section with which the locks of the manufacturing plant, for example a drier, are supplied.

From DE-A 35 01 643 a method is known for recovering solvents in cleaning processes employing organic solvents in which the solvent present in the form of a mixture of solvent vapour and air after pumping off the liquid solvent constituents is partially condensed out by cooling in a solvent condenser. The recovery of the solvent or solvents is by condensation in the vapour chamber of a solvent condenser by heat exchange with a refrigerant which vaporizes thereby. The refrigerant is conducted in a closed circuit via this solvent condenser or refrigerant evaporator, a compressor, a refrigerant liquefier and via an expansion valve.

In the solvent condenser excess solvent constituents are condensed and supplied to a solvent supply tank. The solvent vapour collecting in accordance with the saturation partial pressure in the vapour chamber of the solvent condenser passes thereafter into the refrigerant liquefier and is there heated against the refrigerant which is in turn liquefied.

A similar arrangement of refrigerant evaporator and condenser disclosed in GB-A 20 10 104. The refrigerant condenser and the refrigerant evaporator are each accommodated in gas-tight containers. A liquid mixture comprising a volatile component to be recovered is introduced into the container with the refrigerant condenser. The liquid mixture is heated by heat exchange with the condensing refrigerant, the volatile component vaporizes and the vapour is introduced into the other container containing the refrigerant evaporator, where the volatile component condenses again. The heat thereby extracted from said component is transferred to the refrigerant conducted in the circuit through the two containers.

Two alternately driven heat exchangers incorporated into an apparatus for recovering the hydrocarbons contained in a gasoline-air mixture are disclosed in DE-C 23 37 055. The gasoline-air mixture is thereby cooled in the regenerated of the two alternatable heat exchangers to such an extent that by freezing out the uncondensed hydrocarbons and the remaining water vapour are also separated from the air. Prior to its cooling, for regeneration of the other heat exchanger charged in an earlier operating phase the gasoline-air mixture is first supplied to said heat exchanger and then returned to the regenerated heat exchanger. A similar heat exchanger arrangement for a solvent recovery apparatus is also known from DE-A 39 30 239, which was not prior published.

If, as in these known continuously operated solvent condensers, a solvent condenser is used which on the refrigerant side is constructed as injection evaporator, i.e. in which the refrigerant completely vaporizes in the tubes of the evaporator and the fluid to be cooled is conducted round the tubes, then although the amount of circulating refrigerant can be kept small, there is the disadvantage that in this evaporator design the irregular distribution of the refrigerant has a disadvantageous effect on the tubes and in the latter, and as a result the surface temperature thereof is likewise irregular.

Apart from the injection evaporator, in the literature (cf. Lueger, Lexikon der Technik, of 1970, volume 16) the so-called flooded evaporator is known in which the evaporator container is almost filled with refrigerant and the medium to be cooled is conducted in a tube coil or a tube bank in the evaporator container through the liquid refrigerant. The refrigerant vapour is extracted at the upper part, usually via a vapour dome.

It is known from U.S. Pat. No. 4,276,751 that flooded evaporators connected in parallel can be used in an automatic ice machine for forming ice from water. In this case, the configuration as flooded refrigerant evaporator is an obvious choice simply because of the desired ice formation. For this purpose, the water necessary is flooded by refrigerant in the cells of a container and cooled until ice forms. During the entire cooling the water rests in the cells, which give the ice forming the desired shape. After conclusion of each ice-forming cycle "hot" refrigerant gas flows round the container with the ice in order to detach the latter from its cells. Because of the nature of the ice formation, this icing machine is operated cyclically with an ice-formation and a thaw cycle. In contrast, ice formation is not desirable in a solvent condenser for a solvent recovery apparatus in which the solvent to be recovered expediently flows through the condenser to avoid interrupting the continuous operation of the apparatus by removal of the frozen solvent.

SUMMARY OF THE INVENTION

The invention therefore has as its object the provision of a solvent condenser in which the known disadvantages of the prior art do not occur; in particular, as uniform a temperature distribution as possible is to be achieved on the heat-exchange surfaces between the refrigerant and the carrier gas/solvent mixture and a good regulation made possible even with small temperature and pressure fluctuations.

The invention therefore proposes in a solvent condenser for an apparatus for recovering solvent from a carrier gas/solvent mixture the improvement wherein the solvent condenser is formed by at least one flooded evaporator.

Further developments are defined by the features of the subsidiary claims.

The advantages obtained with the invention are due essentially to the fact that the mixture of carrier gas and solvent conducted in the tubes of the evaporator is uniformly surrounded by liquid refrigerant. Thus, the same amounts of heat are transferred by all cross-sections or tubes traversed by the mixture. As a result, in all the tubes the same temperature distribution arises in the flow direction, i.e. the carrier gas/solvent mixture has the same temperature in particular at all tube ends when they are brought together. It is precisely this property which improves the matching of the individual components of the solvent recovery apparatus. In injection evaporators, on the other hand, the refrigerant-conducting tubes first surrounded by hot mixture flow transfer greater amounts of heat than the tubes further upstream, with the result that more solvent also condenses thereon, thereby giving in turn an only inaccurately predictable temperature distribution in the space of the flowing mixture.

Thus, by constructing the condenser as flooded evaporator the controllability of the refrigerant circuit with very small temperature and pressure fluctuations is improved and an increased calculation and setting accuracy of the exit charge of the solvent capacitor traversed by the carrier gas/solvent mixture achieved.

In solvent recovery, a very particular problem encountered is that a solvent condenser in operation gradually becomes clogged by freezing solvent components or residual moisture contained in the mixture and thereby jeopardizes the necessary operational continuity.

To prevent the clogging of the solvent condenser by freezing solvent or the water contained therein, in already mentioned DE-A 39 30 239.3 it is proposed that a solvent condenser arrangement be used for recovering the solvent from a carrier gas/solvent mixture in which one of two condensers is operated whilst the other is defrozen in order to eliminate operational disturbances by clogging of the solvent circuit.

Hitherto, the use of one or more flooded evaporators in solvent recovery apparatuses was prevented by the long shutdown time of such evaporators necessary for defreezing, due to the large amount of refrigerant in the flooded evaporator compared with an injection evaporator, which must be completely evaporated when changing from the operating to the defreeze state. The changeover times must however be kept as short as possible because during the changeover the solvent is not adequately separated. In U.S. Pat. No. 4,276,751, for changing from the operating to the defreeze state, it is proposed that at the end of the operating cycle "hot" refrigerant be introduced into the refrigerant chamber of the evaporator and thereby the same but colder refrigerant necessary for the ice-formation process expelled from the evaporator. This requires however corresponding circuits with additional components, for example pumps, for the refrigerant at two different temperature levels. Moreover, the problem still remains of still having to completely evaporate previously the liquid cold refrigerant.

In a particularly expedient form of the invention at least two flooded evaporators are used in alternating operation. It is precisely the use of alternatingly operated flooded evaporators which was prevented by the aforementioned long changeover time from one evaporator to the other. According to the invention, the problem of shifting the refrigerant from the one evaporator to the other within the shortest possible time on changing between the solvent condensers is solved by utilizing the enthalpy contained in the carrier gas/solvent mixture by a convenient arrangement and control of corresponding shutoff means, in particular valves, of the condenser/evaporator. Here, in particularly advantageous manner the refrigerant outlet of a flooded evaporator or of the flooded evaporators, if more than one are used, in particular alternately operated evaporators, is adapted to be shut off.

BRIEF DESCRIPTION OF THE DRAWINGS

The invention will be described in detail hereinafter with reference to a preferred embodiment with the aid of the drawings. Further advantages and features of the present invention will be clear therefrom. In the drawings.

DESCRIPTION OF THE PREFERRED EMBODIMENT

Figure 1:
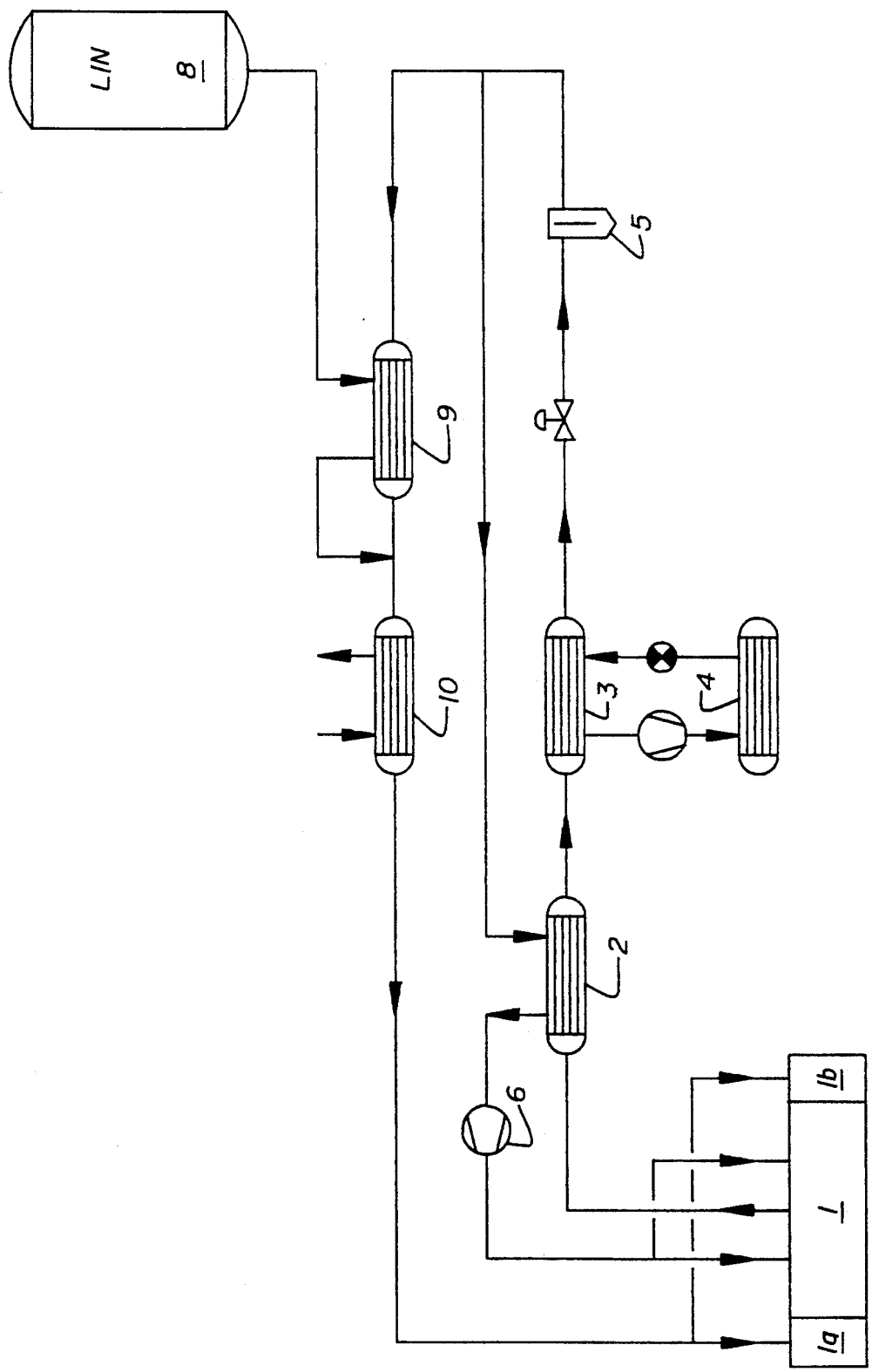
FIG. 1 is a schematic diagram of a solvent recovery apparatus.

The basic construction of such a recovery apparatus for removal from or supplying of a drier 1 is apparent in FIG. 1. The drier 1 illustrated therein is charged continuously or batchwise with the articles to be dried, for example video and audio tapes, and at its inlet and its outlet comprises locks 1a, 1b which are supplied with nitrogen and therefore form a protective curtain between the solvent atmosphere in the interior of the drier 1 and the ambient air.

The solvent-charged nitrogen accruing in the drier 1 is supplied to a heat exchanger 2 of the solvent recovery apparatus, where said mixture is precooled. High-boiling components are condensed in the heat exchanger 2 in accordance with the vapour pressure curve. In addition, the heat exchanger 2 serves also for heat recovery.

The precooled solvent/nitrogen mixture freed from high-boiling components passes from the heat exchanger 2 into a solvent condenser 3 in which the main component of the solvent is condensed against outside cold. The outside cold is furnished by the evaporator 3 of a refrigerating machine with refrigerant condenser 4.

From the evaporator 3 the two-phase mixture of liquid solvent/gaseous nitrogen passes to a solvent separator 5 where the solvent is separated from the nitrogen; the prepurified nitrogen flows from the separator 5 back into the heat exchanger 2 and is heated there in heat exchange with the solvent/nitrogen mixture withdrawn from the drier 1. A fan 6 extracts the nitrogen from the heat exchanger 2 and returns it to the drier 1.

The recovered solvent collected in the separator 5 is intermediately stored in a container and usually pumped back by the pump to the tank store for the solvent (not illustrated).

To prevent any oxygen from penetrating into the drier 1 and the solvent from being able to leave the drier 1, the locks 1a, 1b of the drier are supplied with nitrogen to generate a positive flow in both directions, i.e. outwardly to the front of the locks and inwardly into the drier.

To ensure a positive flow from the locks 1a, 1b into the drier 1 the flushing nitrogen necessary for this purpose is continuously withdrawn from the nitrogen circuit behind the separator 5; however, in accordance with the vapour pressure curve this withdrawn nitrogen still contains a quantity of solvent such that said gas mixture must not be released to the environment.

For this reason, said gas mixture is strongly cooled in a low-temperature section 9 and thus freed from solvent to such an extent that the solvent content of the gas mixture lies beneath the values prescribed by law. The coldness necessary for this purpose is made available by the liquid nitrogen which is taken from the tank 8.

The nitrogen taken from the tank 8 and now vaporized is supplied together with the purified withdrawn nitrogen after heating in a further heat exchanger 10 to the locks 1a, 1b.

Figure 2:
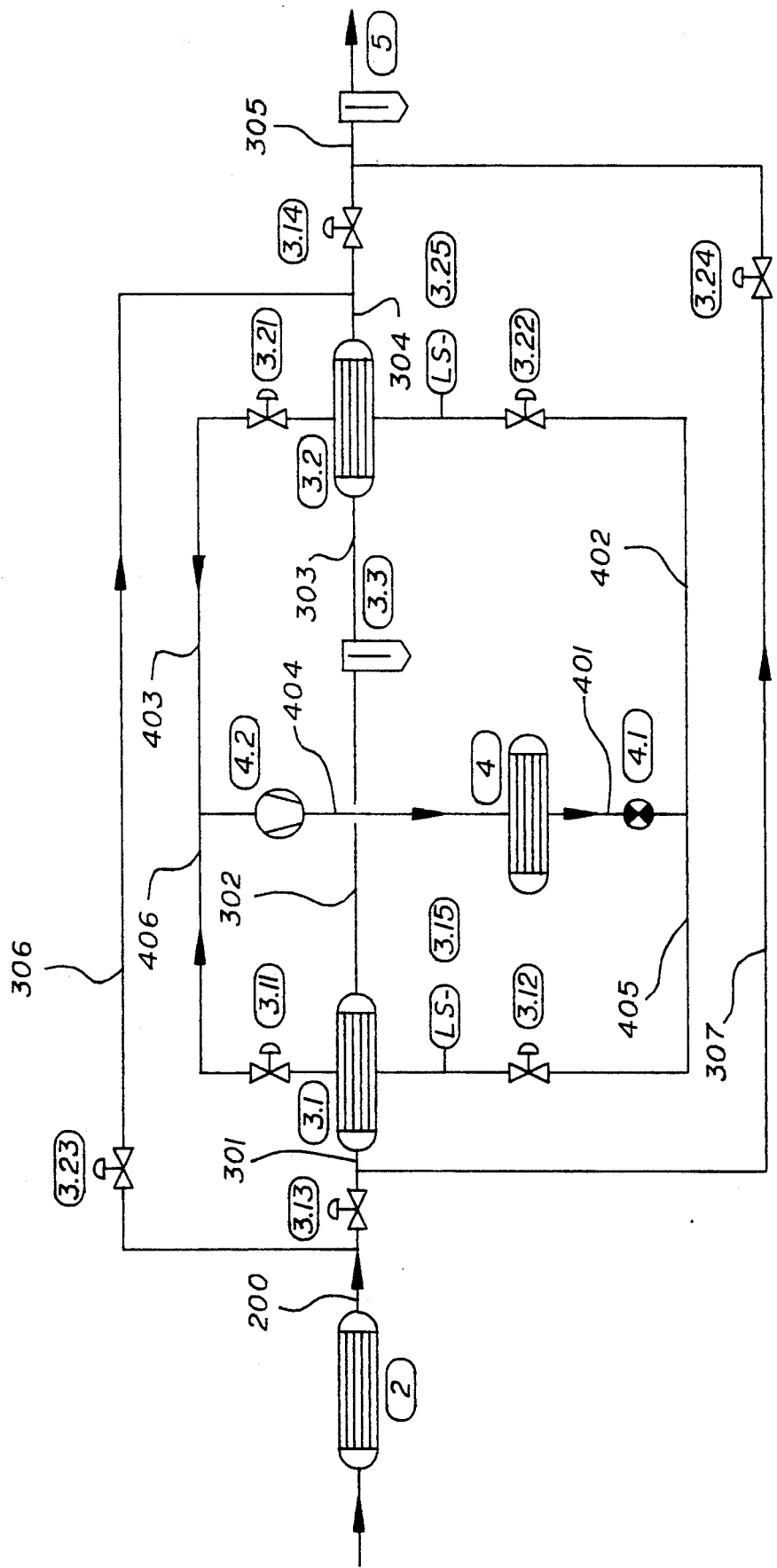
FIG. 2 is a schematic diagram of a solvent condenser for a solvent recovery apparatus according to FIG. 1 having two alternately operated flooded evaporators.

FIG. 2 shows the schematic construction of the solvent condenser 3 or the solvent condenser arrangement 3.1, 3.2 according to FIG. 1.

As far as possible here, the same reference numerals as in FIG. 1 are employed and consequently corresponding components need not be described again. The drier 1 having the locks 1a, 1b and the nitrogen supply is not shown again in FIG. 2.

In the apparatus according to FIG. 2 the carrier gas/solvent mixture, preferably with nitrogen as carrier gas, passes via the heat exchanger 2 into the mixture circuit and via opened valves 3.13 and 3.14 with closed valves 3.23 and 3.24 successively through the refrigerant evaporators/solvent condensers 3.1 and 3.2 or, with opened valves 3.23 and 3.24 and closed valves 3.13 and 3.14, successively through the refrigerant evaporators 3.2 and 3.1. These evaporators 3.1, 3.2 are constructed as flooded evaporators.

Between the two solvent condensers 3.1 and 3.2 a liquid separator 3.3 effective in both flow directions of the gas mixture is provided for collecting the condensing solvent and water.

Via a float valve 4.1 and selectively a valve 3.12 or 3.22 the condenser 4 of a refrigeration machine supplies refrigerant, preferably Freon, to the particular evaporator 3.1 or 3.2 in operation. After the evaporation the refrigerant is sucked in by a compressor 4.2 via the valves 3.11 and 3.21 and again supplied to the condenser 4.

Below, an operating and defreezing cycle is described.

At the start of the cycle the flooded evaporator 3.1 is switched to defreeze and the flooded evaporator 3.2 to operation.

In the carrier gas/solvent circuit the valves 3.13, 3.14 are then open and the valves 3.23 and 3.24 closed.

The path of the nitrogen/solvent mixture leads from the heat exchanger 2, where it is precooled and already freed from high-boiling solvent components, via the conduits 200 and 301, the condenser/evaporator 3.1, the conduit 302, solvent separator 3.3 and the conduit 303 into the condenser/evaporator 3.2 which is in operation and from which it emerges as two-phase mixture of gaseous nitrogen and liquid solvent and passes via the conduits 304 and 305 to the solvent separator 5.

In the refrigerant circuit the valves 3.11, 3.21, 3.22 are open and the valve 3.12 closed. The flooded evaporator 3.2 is filled with refrigerant, the flooded evaporator 3.1 is empty. From the condenser/evaporator 4 of a refrigeration machine the condenser/evaporator 3.2 is supplied with liquid Freon via the conduit 401, the float valve 4.1 and the conduit 402. The Freon evaporated in the condenser/evaporator 3.2 is sucked by the compressor 4.2 via the conduit 403 and is again supplied to the condenser 4 for liquefying the Freon.

On changeover, in the nitrogen/solvent circuit the valves 3.13 and 3.14 are closed and 3.23 and 3.24 opened. As a result, the flow direction of the nitrogen/solvent mixture through the evaporators from "3.1 to 3.2" is reversed to "3.2 to 3.1". The nitrogen/solvent mixture now passes from the heat exchanger 2 via the conduits 200, 306 and 304 firstly to the condenser/evaporator 3.2 In spite of precooling by the heat exchanger 2, the mixture is still warm enough for the solvent constituents and water components frozen out during the preceding operational state of the condenser/evaporator 3.2 to be thawed. These are thens supplied with the nitrogen/solvent mixture via the conduit 303 to the solvent separator 3.3 and there separated from the gaseous nitrogen/solvent mixture. The gaseous mixture passes via the conduit 302 to the condenser/evaporator 3.1 now in operation. The emerging two-phase mixture of gaseous nitrogen and liquid solvent is finally led via the conduit 307 to the solvent separator 5.

In the refrigerant circuit, on changeover the valve 3.21 is closed and the valve 3.12 opened. Since the evaporator 3.2 is now the first to enter heat exchange with the still warm nitrogen/solvent mixture, the vapour pressure of the refrigerant therein rises and displaces the liquid Freon via the opened valves 3.22 and 3.12 into the evaporator 3.1. As soon as this operation is terminated, by a switching element 3.25 controlling the liquid level of the Freon in the evaporator 3.2 the valve 3.22 is closed and the valve 3.21 opened. The evaporated Freon remaining in the evaporator 3.2 is inspired by the compressor 4.2 together with the Freon evaporating in the evaporator 3.1 and supplied to the condenser 4. The evaporator 3.1 is now supplied with liquid Freon by the condenser 4 via the float valve 4.1 and the conduit 405. This completes the changeover phase and the evaporator 3.1 is thus then in operation whilst 3.2 defreezes.

In the next changeover phase the valves 3.13 and 3.14 are opened and 3.23 and 3.24 closed. As a result, the flow direction of the carrier gas/solvent mixture is reversed. At the same time, in the refrigerant circuit the valve 3.11 is closed and the valve 3.22 opened. The then resulting pressure rise of the refrigerant in the evaporator 3.1 expels the refrigerant via the open valves 3.12 and 3.22 into the evaporator 3.2. When the evaporator 3.1 has been emptied of liquid refrigerant, under the control of a further switching element 3.15, which may be coupled to said circuit 3.25 or combined to form a common circuit or control, the valve 3.12 is closed and the valve 3.11 opened. This concludes a complete cycle.

We claim:

1. A solvent condenser for an apparatus for recovering solvent from a carrier gas/solvent mixture, wherein:
   the solvent condenser is formed by at least one flooded evaporator:
      (a) comprising tubes containing the carrier gas/solvent mixture and
      (b) defining a refrigerant chamber surrounding the tubes, wherein the refrigerant chamber is flooded with a refrigerant; and
   the refrigerant on switching the flooded evaporator from an operational to a defreeze state is displaced out of the flooded evaporator due to a pressure rise in the refrigerant chamber caused by the influence of the warm carrier gas/solvent mixture.

2. A solvent condenser for an apparatus for recovering solvent from a carrier gas/solvent mixture, wherein:

the solvent condenser is formed by at least one flooded evaporator defining a refrigerant chamber flooded with a refrigerant;

the flooded evaporator is provided with shut off means for shutting off both an outlet for evaporating refrigerant and an inlet/outlet for liquid refrigerant; and upon changeover of the flooded evaporator from an operational state to a defreeze state, (a) initially the outlet for the evaporating refrigerant is shut off and the inlet/outlet for the liquid refrigerant is open, and (b) by a switching element, as soon as the flooded evaporator is emptied of liquid refrigerant, the inlet/outlet for the liquid refrigerant is closed and the outlet for the evaporating refrigerant is opened.

3. A solvent condenser for an apparatus for recovering solvent from a carrier gas/solvent mixture, wherein:

the solvent condenser is formed by an arrangement of at least two flooded evaporators, with a first flooded evaporator in an operating state and a second flooded evaporator in a defreeze state;

the flow direction of the carrier gas/solvent through the solvent condenser is switched over simultaneously with a change between the operating state and the defreezing state; and the flow direction of the carrier gas/solvent mixture through the arrangement of at least two flooded evaporators is controlled by means of two valve groups which are each formed by an inlet valve and an outlet valve of the arrangement and are operated in alternating connection with each other.

4. A solvent condenser according to claim 1, wherein the flooded evaporator has a refrigerant outlet and is provided with shut off means to shut off the refrigerant outlet of the flooded evaporator.

5. A solvent condenser according to claim 1, wherein at least two flooded evaporators are provided, of which at least one is in the operating state and another in the defreeze state.

6. A solvent condenser according to claim 5, wherein the refrigerant is shifted from one flooded evaporator to another flooded evaporator on changing from the operational to the defreeze state.

7. A solvent condenser according to claim 1, wherein the refrigerant is supplied to the flooded evaporator from a condenser of a refrigerating machine via a float valve.

8. A solvent condenser according to claim 1, wherein the flooded evaporator has a refrigerant supply and a refrigerant outlet and is provided with shut off means to shut off both the refrigerant supply and the refrigerant outlet of the flooded evaporator.

9. A solvent condenser according to claim 1, wherein for setting the shut off means a switching element actuatable in dependence upon the filling level of the evaporator is provided.

10. A solvent condenser according to claim 5, wherein between the flooded evaporators a liquid depositor effective in both directions of flow is arranged.

11. A solvent condenser according to claim 1, wherein the carrier gas/solvent mixture is precooled in a heat exchanger prior to introduction into the solvent condenser.

* * * * *

UNITED STATES PATENT AND TRADEMARK OFFICE
CERTIFICATE OF CORRECTION

PATENT NO. : 5,224,359
DATED : July 6, 1993
INVENTOR(S) : Michael Karthaus et al.

It is certified that error appears in the above-indentified patent and that said Letters Patent is hereby corrected as shown below:

On the title page, following "(73) Assignees:" correct the Assignees to read:

--Herco-Kuhltechnik Hermanns und Co. GmbH; Air Products GmbH--.

Signed and Sealed this

Thirteenth Day of September, 1994

Attest:

BRUCE LEHMAN

Attesting Officer     Commissioner of Patents and Trademarks